Feb. 22, 1944. A. HANSEN, JR 2,342,141
FORCE MEASUREMENT
Filed Jan. 30, 1942  2 Sheets-Sheet 1
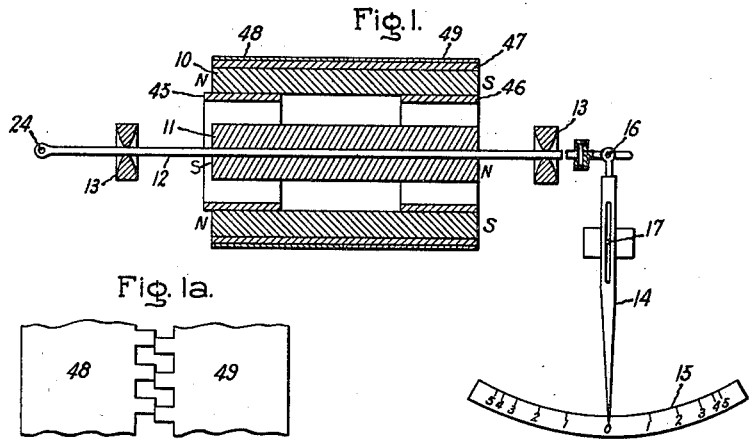
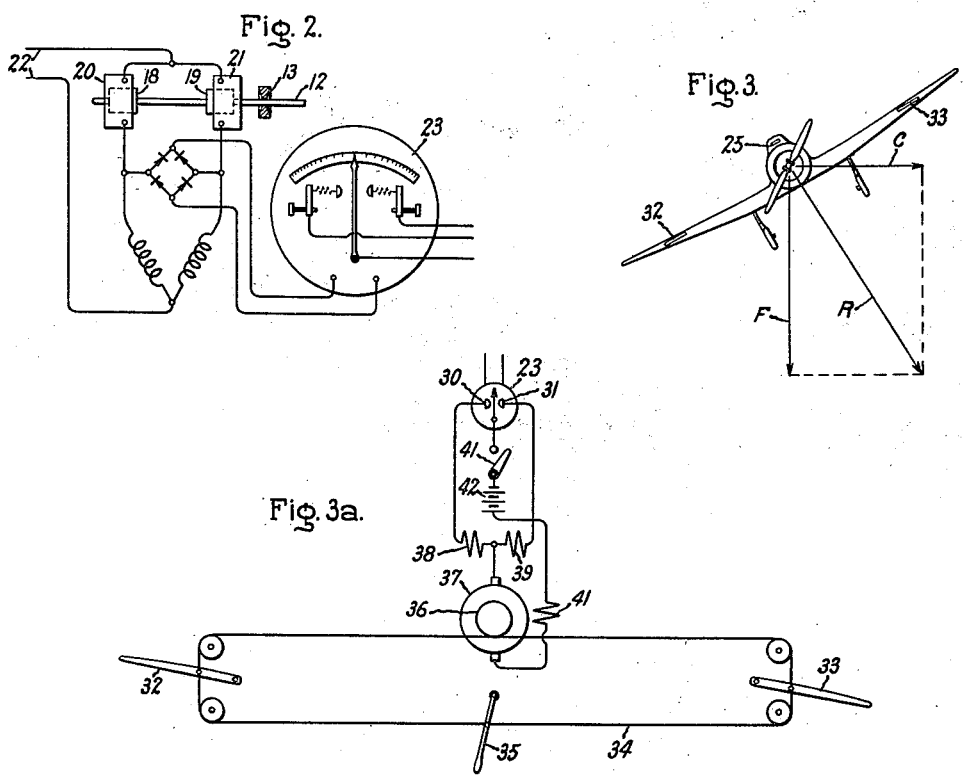
Inventor:
Albert Hansen, Jr.,
by Harry E. Dunham
His Attorney.

Feb. 22, 1944.   A. HANSEN, JR   2,342,141
FORCE MEASUREMENT
Filed Jan. 30, 1942   2 Sheets-Sheet 2
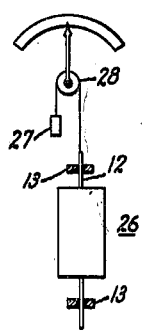
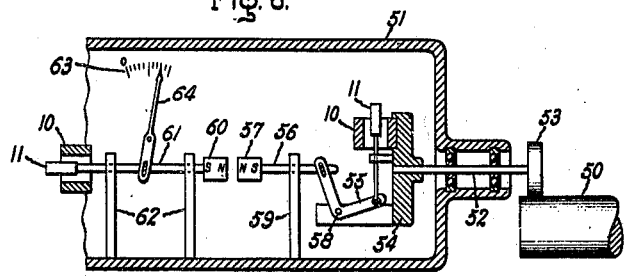
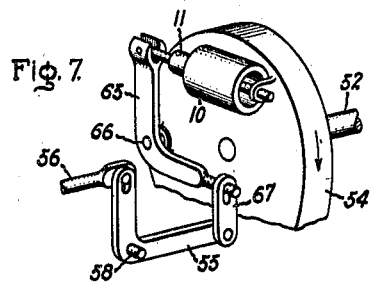
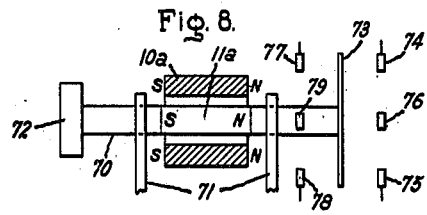
Inventor:
Albert Hansen, Jr,
by Harry E. Dunham
His Attorney.

Patented Feb. 22, 1944

2,342,141

UNITED STATES PATENT OFFICE 2,342,141

FORCE MEASUREMENT

Albert Hansen, Jr., Nahant, Mass., assignor to General Electric Company, a corporation of New York Application January 30, 1942, Serial No. 428,896

9 Claims. (Cl. 265—1)

My invention relates to a magnetic force resisting, transferring, measuring and indicating device and may be adapted as an acceleration or bank indicator, for example.

In carrying my invention into effect I provide a pair of relatively movable telescoping permanent magnets preferably with their opposite poles adjacent each other such that their relative axial displacement is opposed or modified by a magnetic force acting in a sense like a spring. Such axial displacement may be caused by the force to be measured whereby the magnitude of such displacement becomes a measure of such force. My magnetic force resisting or modifying device is to be preferred over a spring or springs in many instances because the magnetic force resisting device is not subject to fatigue, has small temperature errors that may be readily compensated for if desirable, adapts itself to reliable and adjustable damping and may be used between stationary and rotating parts without mechanical connections.

The features of my invention which are belieyed to be novel and patentable will be pointed out in the claims appended hereto. For a better understanding of my invention reference is made in the following description to the accompanying drawings in which Fig. 1 represents a cross section of a preferred form of my invention with directly attached mechanical indicator. Fig. 1a represents a detail of a temperature compensator used in Fig. 1. Fig. 2 represents one way of electrically transmitting the measurement displacement to a distant point and its application to automatic control. Figs. 3 and 3a represent the application of my invention as a bank indicator and control for aircraft. Fig. 4 represents the application of the invention for measuring horizontal acceleration or deceleration. Fig. 5 represents its application for measuring vertical acceleration or deceleration. Fig. 6 represents an angular velocity measuring device. Fig. 7 represents a modification of Fig. 6 whereby angular acceleration may be measured, and Fig. 8 represents a toggle embodying my invention.

Referring now to Fig. 1, 10 and 11 represent two cylindrical shaped permanent magnets in coaxial concentric relation. In the representation, magnet 10 will first be assumed to be stationary and magnet 11 movable axially of magnet 10 by being supported on a rod 12 slidable through low friction guides or bearings 13. The two magnets are of the same or approximately the same length and are polarized in opposite directions, such that the opposite poles of the magnets lie adjacent to each other. Thus there is magnetic attraction between them which yieldingly resists axial displacement in either direction from the centered position shown where the opposite poles of the two magnets approach nearest each other. The radial flux lines between the two magnets may be likened to the action of a plurality of rubber strands or springs fastened between the magnets at their ends and under tension which tension is increased by relative axial displacement of the magnets in either direction. Unlike rubber strands or tension springs, the permanent magnet flux lines are not subject to fatigue and require no mechanical connections. Good permanent magnets properly stabilized should be used so they will not become weaker with age or the use contemplated. Materials having a stabilized coercive force of the order of 800 oersteds for the permanent magnets suitable for my invention include those described in United States Patent 2,170,047.

An important feature of the use of high coercive force permanent magnets is that if the device has slight eccentricity in the positioning of magnets 10 and 11 the unbalance of the magnet forces does not become serious because the high coercive force material does not permit a shift of flux from the high air gap side to the low air gap side such as would be the case if one or both of the elements 10 or 11 were of low coercive force magnetic material and hence this device may not be compared with a solenoid with a low coercive force magnetic core.

The force resisting characteristics of the device may be modified within limits by changes in the shape, strength and disposition of the magnets. It should be noted also that as the north end of one magnet approaches the north end of the other magnet repulsion takes place. It is now seen that the device may be employed to measure various forces by causing the force or froces to be measured to displace the movable magnet 11 in an axial direction and measuring the displacement. Such displacement may be caused to move a pointer 14 over a scale 15. In the illustration the pointer 14 may be coupled to the rod 12 at 16 in such a manner as to allow the rod 12 to rotate on its axis and the pointer is pivoted between its ends at a stationary pivot 17. For example, the rod 12 may have a swivel joint between the main part of the rod and the part pivoted to pointer 14, as illustrated in Fig. 1. The pivot point 17 may be adjusted towards and away from the pivot 16 to vary the degree of amplification of the indicating arrangement. The scale calibration shown represents the desirable force displacement characteristic of the device. Its most sensitive range is for small forces with decreasing sensitivity as the displacing force and displacement increases.

Now it will be evident that magnet 10 may be moved endwise for various calibration or compensation purposes. For example, in Fig. 1 the magnet 10 may be adjusted endwise to cause the pointer 14 to read on zero under a desired set of conditions. An important feature of such an arrangement as compared to a spring which must be fastened at both ends lies in the fact that the magnet 10 may be rotated about its axis without influencing the measurement and hence may be either a stationary or rotary element. Hence the force measuring device may be used to measure axial displacement between relatively rotating parts with the same convenience and accuracy as between parts, neither of which rotates.

Various refinements may be incorporated into the force measuring device as and when desired. For example, in Fig. 1 I have represented cylindricals parts 45 and 46 snugly but adjustably fitted within the hollow magnet 10. These parts are made of a conducting material such as copper and are more or less cut by the flux between the N and S poles of the outer and inner magnets 10 and 11. These serve as damping means for the device since any sudden axial displacement of the two magnets will produce eddy currents in such conductor parts. Adjustment of these parts 45 and 46 along the magnet 10 will vary the extent of such damping. The part 45 is adjusted for greater damping than part 46. A reduced damping will occur when both parts are moved together to a central position. A further reduction in the damping effect can be had by removing one part entirely and adjusting with the other.

Where the device is to be used in locations subject to a considerable temperature variation likely to vary the strength of the permanent magnets and cause a temperature error in operation, I may provide temperature compensation therefor as follows. Surrounding magnet 10 is a thin cylinder 47 acting as a magnetic spacer. It may be of any suitable non-magnetic material and may be of skeleton construction. Surrounding spacer 47 are temperature compensating member which for ease in adjustment may be made in two cylindrical parts 48 and 49. These parts are made of a material, the permeability of which decreases with rise in temperature such, for example, as the temperature compensating magnetic alloy described in U. S. Patent 1,706,171, March 19, 1929, to Kinnard. The parts 48 and 49 are used to shunt a relatively small part of the flux of magnet 10 and the amount of flux thus shunted decreases with rise in temperature to compensate for the decrease in strength of the permanent magnets 10 and 11 with rise in temperature. The exact amount of flux shunted may be made adjustable for example by providing the adjacent edges of the parts 48 and 49 with teeth, as shown in Fig. 1a, and relatively adjusting these parts to provide more or less contacting area between them. The parts may actually be separated by an air gap or they may be intermeshed to provide maximum shunting and temperature compensation. While the damping and temperature compensating parts may also be placed on the inner magnet 11 it is preferable to place them as shown where they are more easily accessible for adjustment purposes. The strength of the permanent magnets themselves may be readily adjusted in the usual way by magnetization and knock down. However, they should be sufficiently knocked down after any adjustment that they will remain at a definite stabilized strength.

If desired the displacement measurement may be transmitted electrically to a distant point and one way of doing this is represented in Fig. 2. Here the rod 12 carries two iron core parts 18 and 19 in telescoping relation with reactance coils 20 and 21 contained in a reactance bridge circuit. The bridge circuit is energized from an alternating current source 22 and unbalance of the bridge is measured by an instrument 23 preferably of the rectifier type shown so that the indication will not only show the extent of unbalance but also the direction of unbalance. The core parts 18 and 19 may be equally inserted in their coils 20 and 21 for zero displacement of the rod 12. Then for displacement to the right core 18 moves further out of its coil and core 19 moves further into its coil resulting in a differential unbalance of the reactance bridge in a given direction. Movement in the reverse direction results in unbalance in the opposite direction. It is seen that with such an arrangement the force necessary to move one core part out of its coil is offset by a force of attraction at the other coil. Hence this does not interfere with the accurate measurement of the force being measured. Here again there is no mechanical connection between the parts and rotation of shaft 12 about its axis is immaterial.

The forces to be measured may be caused to displace the rod 12 endwise in various ways. For example, in Fig. 1 an eye 24 is provided at one end of the rod. Tension springs of a uniform length may be tested for uniform strength by hooking them in the eye and pulling them out to a fixed distance to the left. Their tension and differences in tension may then be read on the scale 15.

In Fig. 3 I have represented the application of my force measuring device as an airplane bank indicator. The device is fixed on the plane as at 25 with its displacement axis parallel with the axis of the airplane wing axis. During a banking turn of the airplane as indicated there is a centrifugal force C and the force of gravity F acting on the plane, and also on the movable magnet 11 of my force measuring device. These forces have components tending to displace the magnet 11 in opposite directions from its central position. If their resultant R is perpendicular to the wing axis there is no displacement and this is an indication of a correct airplane banking turn. If the rate of turn is too great for the angle of bank of the plane force C will predominate and produce a corresponding displacement of magnet 11 and indication of such displacement. If the bank is too great for the rate of turn of the plane, force F will predominate and result in a reverse displacement and indication. Thus the device provides a small, reliable, simple and rugged airplane bank indicator which may be so placed in front of the pilot as to be read directly or it may be placed elsewhere and the indication transmitted to the instrument panel as explained in connection with Fig. 2.

In Fig. 3a I have diagrammatically represented how the bank indicator device of Fig. 3 may be used to automatically correct or prevent any incorrect banking operation. In Fig. 3a, 23 represents a bank indicator which is remotely controlled as explained in connection with Fig. 2. The instrument is provided with adjustable limit control contacts 30 and 31 cooperating with the pointer of the instrument as the movable contact. The contacts will be so adjusted that so long as no seriously incorrect banking operation occurs the contacts remain open but such that one contact 30 will be closed for too steep a bank when turning in one direction and contact 31 will be closed for too great a speed when turning in the same direction. When turning in the opposite direction the contacts will close in the reverse order since the bank indicator is or may be made a zero center device. These contacts are then used in connection with the bank control mechanism to temporarily take the control away from the pilot when he banks incorrectly. In Fig. 3a, 35 represents the pilot's bank control stick which is secured to the plane ailerons 32 and 33, see Figs. 3 and 3a, by a cable 34 running over the necessary pulleys. The cable is also passed around a drum 36 which may be clutched to an electric motor 37 by a magnetic clutch, the energizing coil of which is represented at 41. The clutch 41 is in the armature circuit of the motor 37 which is provided with reversing field windings 38 and 39. The motor may be energized from a source 42 through a switch 41 under the control of the contact making instrument 23. Closure of contact 30 causes motor operation and operation of the aileron control cable 34 in one direction and closure of contact 31 causes motor operation and movement of cable 34 in the opposite direction. When no automatic control is called for, the clutch 41 is deenergized and the pilot is free to control the ailerons with stick 35. The automatic control connections are properly made to produce correction of any seriously incorrect banking operations, but to allow the pilot an ample control range. It will be found that the motor 37 should operate in reverse directions to make the same kind of a correction when the plane turns in opposite directions. This is taken care of by reason of the fact that the bank indicator with its contact making instrument also reverses the control operation for banking operations in opposite directions.

In Fig. 4 I have represented my device at 26 with its displacement axis in line with the axis of movement of a vehicle for the measurement of horizontal acceleration or deceleration.

In Fig. 5 my device is represented at 26 with its displacement axis vertical as in an elevator car for the measurement of vertical acceleration and deceleration. A portion of the weight of the movable magnet and its supporting rod 12 may be balanced by a weight 27 hooked to rod 12 by a cord running over a pulley 28. The pulley may be provided with a pointer indicating on a calibrated measurement scale.

In Fig. 6 I have represented my force measuring device as used for measuring centrifugal force and, indirectly, speed. In Fig. 6, 50 represents a rotating shaft and the remaining parts a device which may be applied to the rotating shaft for measurement of its speed. The device comprises a suitable frame or casing 51 in which is supported a rotary shaft 52 having a contact wheel 53 which may be held against shaft 50 to be rotated thereby. Other forms of coupling than that shown may be used. Shaft 52 drives a disk 54. Near the periphery of the disk is secured the outer cylindrical permanent magnet 10 of one of my force measuring devices with its axis radial. The inner permanent magnet 11 with its axis also radial with respect to disk 54 is coupled by a light weight lever 55 to a shaft 56 which carries a permanent magnet 57. Lever 55 is pivoted at 58 to an arm secured to disk 54. Rod 56 is coaxial with the axis of rotation of shaft 52 and disk 54 and is slidably and rotatively mounted on such axis by means of a stationary support 59.

It is now seen that when the disk 54 is rotated, magnet 11 will be pulled radially outward by centrifugal force against the magnetic pull of magnet 10, and in so doing will move permanent magnet 57 to the left. Magnet 57 is adjacent another permanent magnet 60 mounted on a rod 61 slidably mounted in supports 62 on the axis of rotation of shafts 52 and 56. Magnets 57 and 60 are polarized in the direction of the axis of rotation with like poles facing each other so that they repel. Hence, axial movement of shaft 56 is transmitted to rod 61, shaft 56 and magnet 57 being in rotation while shaft 61 and magnet 60 are not rotated.

Displacement of rod 61 to the left may be resisted by a spring but preferably by another of my force measuring devices comprising permanent magnets 10 and 11. The extent of axial displacement of rod 61 to the left is indicated on a scale 63 by a pointer 64. The position of the parts as represented are those which will exist when the shaft 52 is being driven at a considerable speed. The scale 63 may be calibrated in R. P. M. of shaft 50. It may also be calibrated in centrifugal force units of some rotating part with which the device is associated. The measurements made are independent of the direction of rotation. It will be understood that the additional weight may be added to the uoter end of magnet 11 if that is desirable.

Fig. 7 represents a device of the character shown in Fig. 6 but arranged to measure angular acceleration or deceleration. Parts shown similar to those of Fig. 6 are represented by like reference characters and parts not shown will be similar to those of Fig. 6. The scale used may be of zero center type. In Fig. 7 the force measuring device 10—11 has its axis tangent to the axis of rotation and displaced therefrom. Lever 55 is hooked to permanent magnet 11 through a link 67 and a lever 65 pivoted at 66 to disk 54. The position of the parts as shown indicate displacement of permanent magnet 11 caused by acceleration of disk 54 in the direction of the arrow thereon. A similar displacement would be caused by deceleration of disk 54 if rotating in the opposite direction.

In Fig. 8 I have shown a modified form of my force measuring device used as a toggle for a selective double throw switch. In such device 70 represents an axially movable rod slidably and rotatively mounted in stationary guides 71. The rod has an operating handle 72 at one end and a switch bar 73 at the other and includes a permanent magnet 11a. The parts of the rod, other than the permanent magnet, may be made of insulating material or at least the handle end of the rod 70 should be insulated from the switch bar 73. The rod 70 may be moved to the right from the central position shown to bring bar 73 between and to connect stationary contacts 74 and 75. Also, the rod 70 and bar 73 may be turned through 90 degrees to connect stationary contacts one of which is shown at 76. Also, the rod 70 and bar 73 may be moved to the left of the central position shown to connect stationary contacts 77 and 78 and rotated 90 degrees to connect between contacts, one of which is shown at 79.

In order that the bar 73 shall press firmly against such contacts in any of such positions and in order that the making and breaking of the contacts shall be quick and positive, it is desirable that the movement of rod 70 in an axial direction shall have a toggle action operating thereon, such that there is a force tending to move the rod in either axial direction from the neutral or dead center position shown. This action is provided by the permanent magnets 11a and a stationary magnet 10a similar to those previously described except that both are polarized in the same direction as indicated instead of in opposite directions.

In the neutral or dead center position shown there is repulsion between the adjacent like poles of the two permanent magnets at either end thereof. The slightest movement of the rod 70 in either direction from this position will unbalance the repulsion forces and cause forceful movement of the rod in the direction in which started. For instance, if the rod be moved toward the right, the south poles of the two magnets will repel and the north poles of the two magnets will repel and the south pole of magnet 11a will be attracted by the north pole of magnet 10a, all forcing rod 70 to the right. Hence bar 73 will snap against contacts 74 and 75, for example, and hold the bar firmly against such contacts until forcibly pulled away by handle 72. A similar action takes place in the movement of rod 70 to the left of the central position shown. A switch is a good illustration of the application of the use of the magnets polarized primarily for repulsion, but there may occur instances where similar action would be desirable for force measurement purposes.

If, in Fig. 8, the magnet 10a be reversed, end to end as in Fig. 1, for example, we will have a switch which is biased to open central position and which will return to such position when released and which will need to be forcibly closed to the switch closing positions. It is customary to provide springs for these purposes. My magnetic device has certain advantages in that it is not subject to wear or fatigue and the switch rod may be rotated to any desired angular position, it being free of any connecting parts with the stationary member of the force-producing unit.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. A force-measuring device comprising a pair of co-axial cylindrical permanent magnets of substantially the same length arranged in telescoping concentric relation and polarized in the direction of their axes to produce poles of unlike polarity opposite each other at their adjacent ends, means for mounting said magnets to permit of relative axial movement between them, means for applying thereto a force to be measured in a manner to cause such relative axial movement and means responsive to the extent of such relative axial movement.

2. A force-responsive device, comprising a pair of co-axial cylindrical permanent magnets arranged one inside the other with an intervening space, said magnets being of approximately the same length and reversely polarized in the direction of their length so that their unlike poles are adjacent each other, means for mounting said magnets to permit of relative axial movement between them, means for producing such relative axial movement, means responsive to such relative axial movement and a cylindrical shaped conductor interposed in the flux path between said magnets to damp sudden axial relative movements between them.

3. A force-responsive device comprising a pair of co-axial cylindrical permanent magnets arranged one inside the other with an intervening space, said magnets being of approximately the same length and reversely polarized in the direction of their axes to produce unlike poles adjacent each other at their ends, means for producing relative axial movement between said magnets, means responsive to such movement, and a pair of cylindrical shaped conductors interposed in the flux paths between said magnets and adjustable along one of said magnets to damp sudden axial relative movement between said magnets.

4. A force-responsive device comprising a pair of cylindrical permanent magnets of approximately the same length arranged coaxial one inside the other, said magnets being reversely polarized in the direction of their axes to produce unlike poles adjacent each other, one of said magnets being axially movable with respect to the other, means responsive to the extent and direction of such relative axial movement and means for compensating said device for changes in permanent magnet strength due to temperature variations comprising a shunt for one of said magnets, spaced therefrom and formed of magnetic material having a negative temperature coefficient of permeability.

5. A force-responsive device comprising a pair of cylindrical permanent magnets of approximately the same length arranged coaxial one inside the other, said magnets being reversely polarized in the direction of their axes to produce unlike poles adjacent each other, one of said magnets being axially movable with respect to the other, means responsive to the extent and direction of such relative axial movement and means for compensating said device for changes in permanent magnet strength due to temperature variations comprising a two-part shunt for one of said magnets spaced therefrom with the two parts adjustable relative to each other to shunt more or less of the flux of said magnet, said shunt being formed of magnetic material which has a negative temperature coefficient of permeability.

6. A force-responsive device comprising a stationary hollow cylindrical permanent magnet polarized in the direction of its axis, a movable cylindrical permanent magnet positioned within and coaxial with respect to the hollow magnet, said movable magnet being substantially of the same length as the hollow magnet and polarized in the direction of its axis but in the opposite direction to that of the hollow magnet, the movable magnet being supported for axial movement, means whereby said movable magnet may be subjected to forces which have components in the direction of the axis of said magnet whereby said movable magnet is displaced from a central position with respect to the stationary magnet against the attracting force of said magnets in proportion to the resultant of said axial force components and means responsive to the direction and magnitude of such displacement.

7. A force-responsive device comprising a pair of cylindrical permanent magnets of substantially the same length mounted in telescoping coaxial relation one inside the other and reversely polarized in the direction of their axes, said magnets being relatively movable in the direction of their axes, rotary supporting means for said magnets for axially displacing one magnet with respect to the other against the attractive force of said magnets in response to the action of centrifugal force upon one of them and means responsive to such displacement.

8. A force-responsive device comprising a pair of cylindrical permanent magnets of substantially the same axial length mounted in telescoping co-axial relation one inside the other and reversely polarized in the direction of their axes, said magnets being relatively movable in the direction of their axes, rotary supporting means for said magnets for axially displacing one of them with respect to the other against the attractive force of said magnets in response to angular acceleration and deceleration of the rotary supporting means and means responsive to such displacement.

9. A force-responsive device comprising a rod-like member mounted so as to be rotated on and moved in the direction of its axis, means for applying a force for causing axial movement of said member between desired limits, and other means for applying additional axial forces on said member yielding in nature, varying in magnitude with the axial position of said member and independent of the rotary position of said member, said other means comprising a permanent magnet included in a section of said member, and a stationary hollow cylindrical permanent magnet freely surrounding and co-axial with the permanent magnet section of the member, said magnets being of substantially the same length and polarized in the direction of axial movement of said member and prodcing such additional forces by reason of interaction of their fluxes.

ALBERT HANSEN, JR.